United States Patent

Chen et al.

[11] Patent Number: 6,041,418
[45] Date of Patent: Mar. 21, 2000

[54] RACE FREE AND TECHNOLOGY INDEPENDENT FLAG GENERATING CIRCUITRY ASSOCIATED WITH TWO ASYNCHRONOUS CLOCKS

[75] Inventors: Feng Chen, Bethlehem; Ravi K. Kolagotla, Lansdale; Le T. Ly, Allentown; Jiancheng Mo, Allentown; Hosahalli R. Srinivas, Allentown, all of Pa.

[73] Assignee: Lucent Technologies, Inc., Murray Hill, N.J.

[21] Appl. No.: 09/131,373

[22] Filed: Aug. 7, 1998

[51] Int. Cl.[7] ........................................... G06F 1/12
[52] U.S. Cl. ............................................... 713/400
[58] Field of Search ..................... 713/401, 600; 327/100, 142, 365, 392, 400, 403; 710/58, 61

[56] References Cited

U.S. PATENT DOCUMENTS

| | | | |
|---|---|---|---|
| 5,311,475 | 5/1994 | Huang . | |
| 5,315,184 | 5/1994 | Benhamida | 327/19 |
| 5,336,938 | 8/1994 | Sywyk . | |
| 5,355,113 | 10/1994 | McClure | 327/64 X |
| 5,781,802 | 7/1998 | Cassetti | 713/401 X |

*Primary Examiner*—Thomas M. Heckler
*Attorney, Agent, or Firm*—Dickstein Shapiro Morin & Oshinsky LLP

[57] ABSTRACT

A flag generating circuit that uses a feedback mechanism to set or reset a flag associated with two systems with asynchronous clocks is provided. Upon receipt of a set flag (or reset flag) signal, the circuit immediately isolates the signal after setting (or resetting) the flag to prevent race conditions between the systems. The clock associated with the setting system is synchronously started when waiting to set the flag and synchronously stopped when waiting for the flag to be reset. The clock associated with the resetting system is synchronously started when waiting to reset the flag and synchronously stopped when waiting for the flag to be set. Accordingly, the flag generating circuit provides a race free and technology independent flag generating circuit capable of setting and resetting flags associated with asynchronous

62 Claims, 4 Drawing Sheets

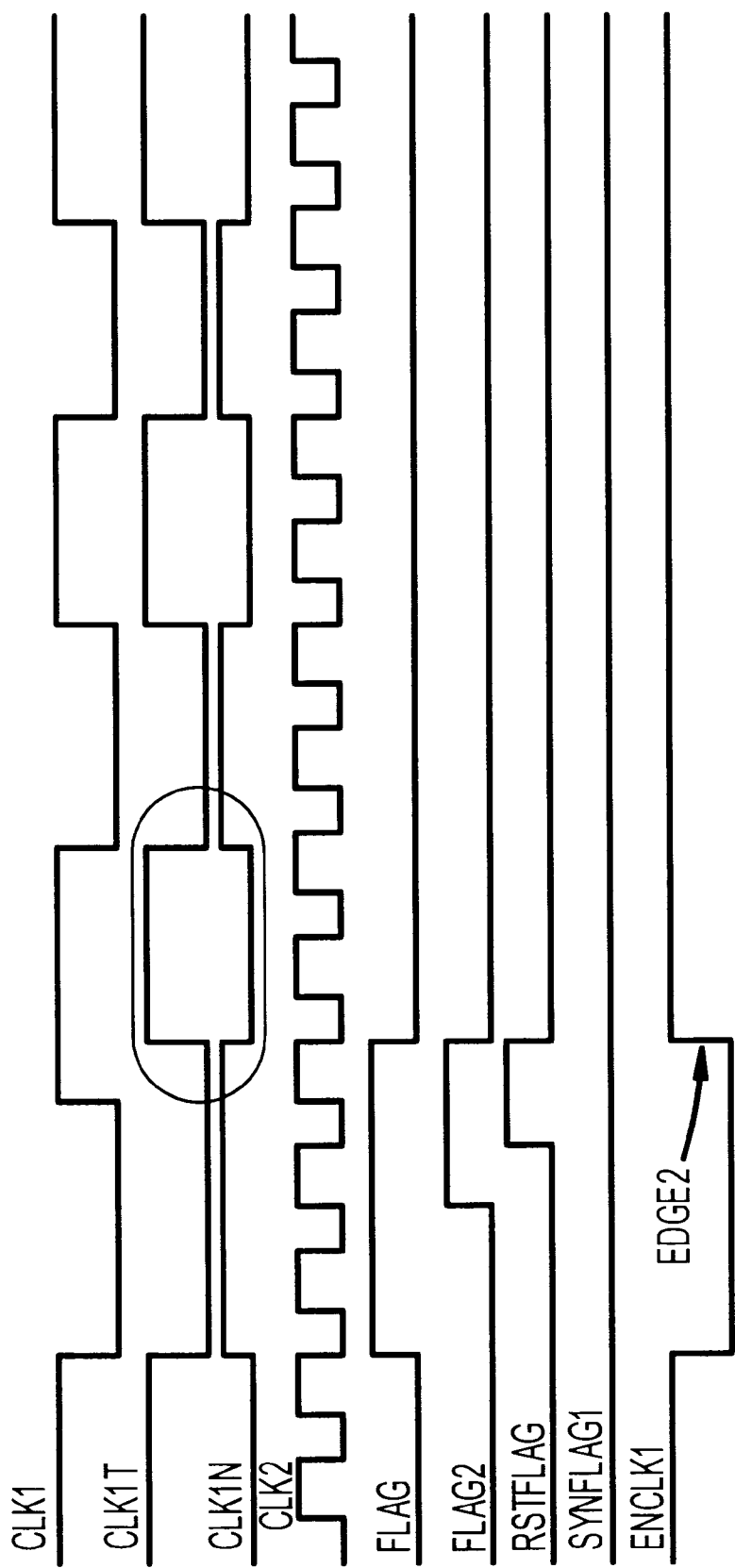

RACE FREE AND TECHNOLOGY INDEPENDENT FLAG GENERATING CIRCUITRY ASSOCIATED WITH TWO ASYNCHRONOUS CLOCKS

BACKGROUND OF THE INVENTION

1. Field of the Invention

This invention relates generally to semiconductor integrated circuits and, more particularly, to a race free and technology independent flag generating circuit associated with two asynchronous clocks.

2. Description of the Related Art

Frequently, two independent systems are required to communicate with each other. Each system has its own clock and, thus, the two systems are usually asynchronous since they each operate at their own clock rate. Often, flags are employed to synchronize the communications between these asynchronous systems.

Flags signal the present condition of a system resource, process state or any other system parameter and are particularly useful when asynchronous systems share a resource or need to synchronize performed tasks. For example, one system may write into a data buffer while the second system will read out of this same data buffer. It is important to synchronize the access to this data buffer to ensure that the correct information is written to or read out of the buffer. The flag is considered an asynchronous flag since it is derived from the asynchronous systems.

FIG. 1 illustrates an example of how systems with asynchronous clocks utilize a flag to synchronize tasks performed by each of the systems. In this example, Task A and Task B cannot be run at the same time and system 1 and system 2 are running in parallel. To prevent system 1 from performing Task A while system 2 is performing Task B, system 1 will only perform Task A (step 12) when it determines that the FLAG is reset (step 10). In this example, a reset FLAG indicates that system 2 is not performing Task B. Once Task A is performed, system 1 will set the FLAG (step 14). In this example, a set FLAG indicates that system 1 is not performing Task A. To prevent system 2 from performing Task B while system 1 is performing Task A, system 2 will only perform Task B (step 22) when it determines that the FLAG is set (step 20). Once Task B is performed, system 2 will reset the FLAG (step 24) which would allow system 1 to perform Task A.

The communication between a digital signal processor (DSP) and an external device, by way of a Joint Test Access Group (JTAG) port is one example of systems with asynchronous clocks. FIG. 2 illustrates a DSP 50 communicating with an external device 60 through a JTAG port 56 residing on the DSP 50. The DSP 50 includes a JTAG interface 54 connected between the JTAG port 56 and a processor 52 for interpreting JTAG signals between the processor 52 and the external device 60.

FIG. 3 illustrates how the DSP 50 and the external device 60 utilize a buffer full flag JFULL to synchronize the reading of, and writing to, a JTAG output buffer JOUT. In this example, the DSP 50 will write to the output buffer JOUT and the external device 60 will read from the output buffer JOUT, but they cannot do so at the same time. To prevent the DSP 50 from writing to the buffer JOUT while the external device 60 is reading from it, the DSP 50 will only write to the buffer JOUT (step 32) when it determines that the buffer full flag JFULL is reset (step 30). In this example, a reset buffer full flag JFULL indicates that the external device has finished reading out the contents of the buffer JOUT. Once the buffer JOUT is written to, the DSP 50 will set the buffer full flag JFULL (step 34). In this example, a set buffer full flag JFULL indicates that the DSP has finished writing into the buffer JOUT. To prevent the external device 60 from reading from the buffer JOUT while the DSP 50 is writing to it, the external device 60 will only read from the buffer JOUT (step 42) when it determines that the buffer fill flag JFULL is set (step 40). Once the buffer JOUT is read from, the external device 60 will reset the buffer fill flag JFULL (step 44) which would allow the DSP 50 to write into the buffer JOUT.

Generally, flags are generated and maintained by flag generating circuitry. This is done so that the asynchronous systems may access the shared resource, synchronize required tasks, etc., without taking steps to set or reset the flag. For example, the DSP 50 may initiate step 34 by simply writing to the output buffer JOUT. The flag generating circuit may use a signal generated by the write operation to set the buffer full flag JFULL. One well known problem that must be compensated for by any flag generating circuit is referred to as a race condition. A race condition occurs when both systems, the DSP 50 and the external device 60, for example, attempt to set or reset the same flag, JFULL, for example, at the same time. Again, this problem arises because the buffer full flag JFULL is being set and reset by two systems with asynchronous clocks. Accordingly, flag generating circuits will often contain "race free" circuitry to avoid race conditions.

FIG. 4 illustrates an exemplary conventional flag generating circuit 70 used to set or reset a flag FLAG while preventing race conditions between the asynchronous signals SETFLAG and RSTFLAG. The circuit 70 is designed to keep the signals SETFLAG, RSTFLAG used to set and reset the flag FLAG very short. Therefore, the circuit 70 creates and uses short pulses to set and reset the flag FLAG. Short pulses are used to lower the probability that two pulses will be generated at the same time (i.e., a race condition between the pulses).

The circuit 70 includes ten inverters 72, 74, 76, 78, 80, 84, 86, 88, 90, 92, two AND gates 82, 94 and an RS latch 96. The output from the non-inverting terminal Q of the latch 96 is used as the flag FLAG. To set the flag FLAG, a set flag signal SETFLAG must be received by the circuit 70. The SETFLAG signal passes through four inverters 74, 76, 78, 80 and is input into the first AND gate 82. The SETFLAG signal also passes through the first inverter 72. The output of the first inverter 72 is input into the first AND gate 82. The output of the first AND gate 82 will be a set flag pulse which is input into the RS latch 96. The length of the set flag pulse is determined by the inverters 72, 74, 76, 78, 80. This set flag pulse will be used to set the flag FLAG output from the latch 96. Likewise, to reset the flag FLAG, a reset flag signal RSTFLAG must be received by the circuit 70. The RSTFLAG signal passes through four inverters 86, 88, 90, 92 and is input into the second AND gate 94. The RSTFLAG signal also passes through the sixth inverter 84. The output of the sixth inverter 84 is input into the second AND gate 94. The output of the second AND gate 94 will be a reset flag pulse which is input into the RS latch 96. The length of the reset flag pulse is determined by the inverters 84, 86, 88, 90, 92. This reset flag pulse will be used to reset the flag FLAG output from the latch 96. The race condition is avoided by using the short pulses to set/reset the flag FLAG.

The pulses used to set and reset the flag FLAG are usually short pulses. Short pulses are used to lower the probability that two pulses will be generated at the same time (i.e., a race condition between the pulses). Unfortunately, the circuit 70 illustrated in FIG. 4 has some shortcomings. For example, the circuit 70 is technology dependent. That is, changes in the types of inverters used in the circuit 70 or the process technology used to manufacture the integrated circuit 70 may cause the lengths of the pulses to change. For example, different sized inverters may cause the length of the pulses to be very short. A very short pulse may not be detected and, thus, the flag may not be set or reset correctly. Conversely, different sized inverters may cause the length of the pulses to be very long. A very long pulse may be treated as two separate pulses which could cause a race condition or other problems. Accordingly, there is a need and desire for a race free and technology independent flag generating circuit capable of setting and resetting flags associated with asynchronous clocks.

SUMMARY OF THE INVENTION

The present invention provides a race free and technology independent flag generating circuit capable of setting and resetting flags associated with asynchronous systems.

The above features and advantages are achieved by providing a flag generating circuit that uses a feedback mechanism to set or reset a flag associated with two systems with asynchronous clocks. Upon receipt of a set flag (or reset flag) signal, the circuit immediately isolates the signal after setting (or resetting) the flag to prevent race conditions between the systems. The clock associated with the setting system is synchronously started when waiting to set the flag and synchronously stopped when waiting for the flag to be reset. The clock associated with the resetting system is synchronously started when waiting to reset the flag and synchronously stopped when waiting for the flag to be set. Accordingly, the flag generating circuit provides a race free and technology independent flag generating circuit capable of setting and resetting flags associated with asynchronous systems.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 6 is a timing diagram illustrating a synchronization problem that is prevented by the flag generating circuitry of the present invention.

DETAILED DESCRIPTION OF THE PREFERRED EMBODIMENTS

Figure 5:
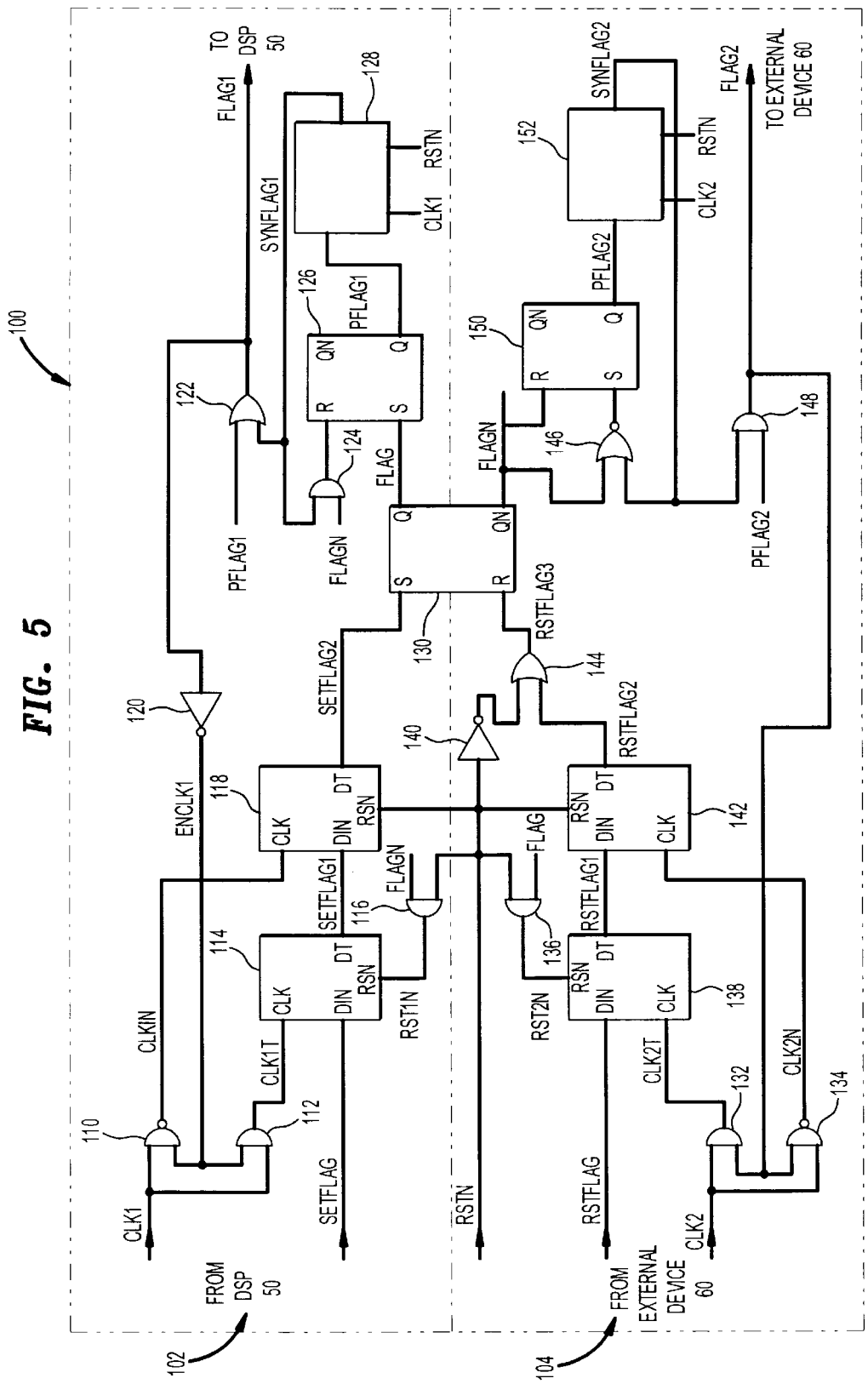
FIG. 5 illustrates a flag generating circuit constructed in accordance with the present invention.

FIG. 5 illustrates a flag generating circuit 100 constructed in accordance with the present invention. As will be discussed below, the circuit 100 uses a feedback mechanism to set or reset a flag FLAG associated with two systems with asynchronous clocks. Upon receipt of a set flag (or reset flag) signal SETFLAG (or RSTFLAG), the circuit 100 immediately isolates the signal SETFLAG (or RSTFLAG) after setting (or resetting) the flag FLAG to prevent race conditions between the systems. The clock associated with the setting system is synchronously started when waiting to set the flag FLAG and synchronously stopped when waiting for the flag FLAG to be reset. The clock associated with the resetting system is synchronously started when waiting to reset the flag FLAG and synchronously stopped when waiting for the flag FLAG to be set. Accordingly, the flag generating circuit 100 provides a race free and technology independent flag generating circuit capable of setting and resetting flags FLAG associated with asynchronous clocks.

Figure 1:
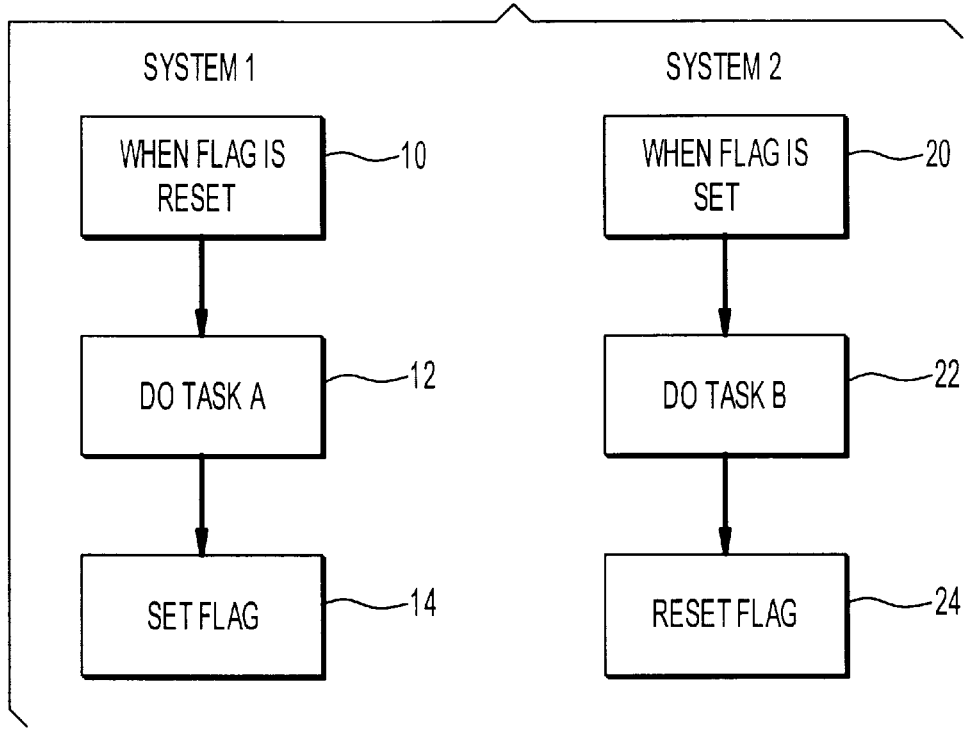
FIG. 1 illustrates an example of how systems with asynchronous clocks utilize a flag to synchronize tasks performed by each of the systems.
Figure 3:
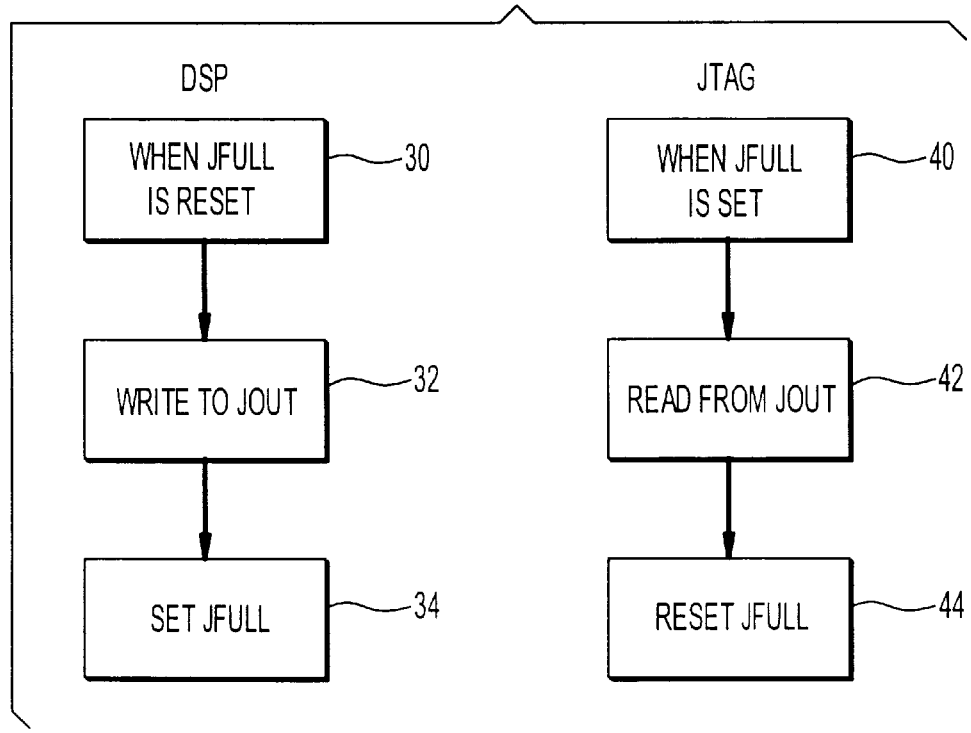
FIG. 3 illustrates one example of how a DSP and an external device utilize a flag to synchronize access to a JTAG output buffer.
Figure 2:
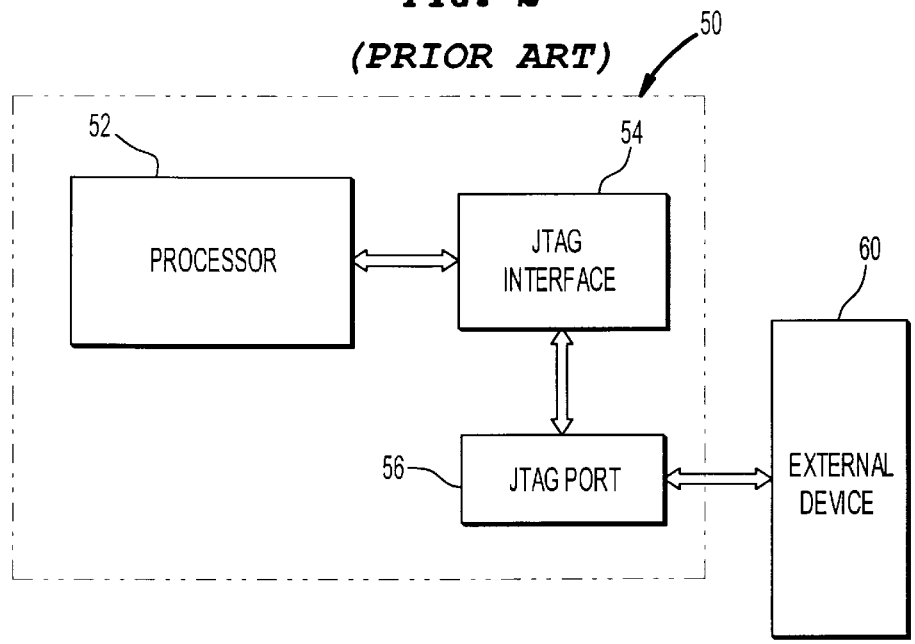
FIG. 2 illustrates in block diagram form how a DSP communicates with an external device through a JTAG port.
Figure 4:
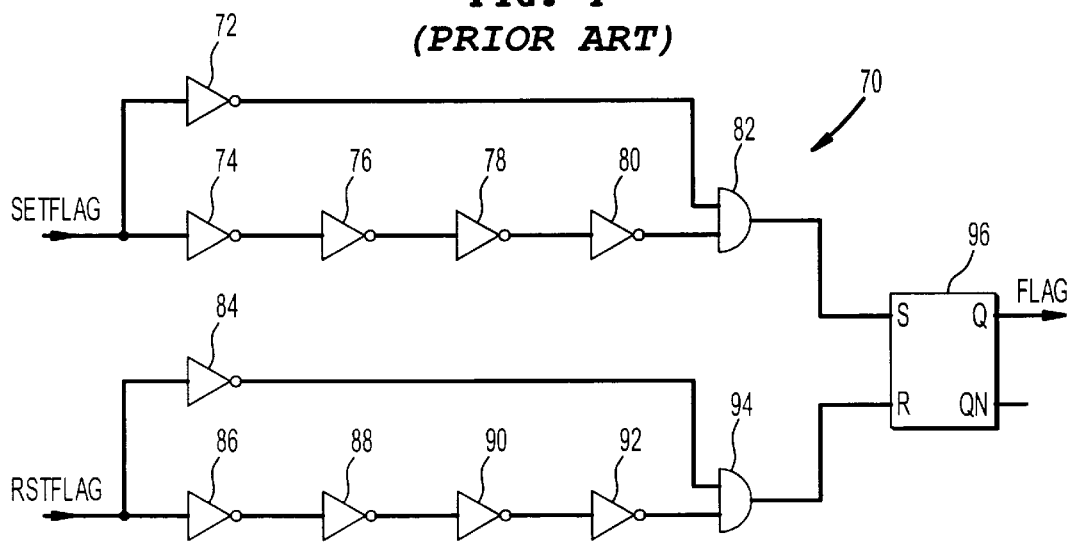
FIG. 4 illustrates a conventional flag generating circuit used to set or reset a flag while preventing race conditions between signals generated by asynchronous clocks.

The circuit 100 includes a flag setting portion 102 and a flag resetting portion 104. The input of the flag setting portion 102 will be connected to the system responsible for setting the flag generated by the circuit 100 while the output of the portion 102 will be connected to the system waiting for the flag generated by the circuit 100 to be reset. Continuing with the example illustrated in FIGS. 2 and 3, the input and output of the flag setting portion 102 will be connected to the DSP 50 and the flag to be set will be the buffer full flag JFULL. The set flag signal SETFLAG will be derived from a write JTAG output buffer signal that occurs when the DSP 50 writes into the output buffer JOUT.

The flag setting portion 102 includes first and second clock drivers 110, 112, first and second AND gates 116, 124, a first OR gate 122, a first inverter 120, a first synchronizer 128, first and second type D latches 114, 118 and first and second RS latches 130, 126. It must be noted that the first RS latch 130 is also shared with the flag resetting portion 104.

The first clock driver 110 has an input connected to the clock signal CLK1 of the DSP 50 and an output CLK1N connected to a clock input CLK of the second D latch 118. The second clock driver 112 has an input connected to the clock signal CLK1 and an output CLK1T connected to a clock input CLK of the first D latch 114. The first D latch 114 receives the set flag signal SETFLAG as a data in input DIN and has an output SETFLAG1 (DT output) connected to a data in input DIN of the second D latch 118. The second D latch 118 has an output SETFLAG2 (DT output) connected to a set input S of the first RS latch 130. The first output FLAG (Q output) of the first RS latch 130 is connected to a set input S of the second RS latch 126. The second complementary output FLAGN (Q output) of the first RS latch 130 is connected to an input of the first AND gate 116 and the second AND gate 124. The outputs FLAG, FLAGN are also connected to the resetting portion 104 (described in detail below).

The first AND gate 116 also has a global reset signal RSTN as an input. The output RST1N of the first AND gate 116 is connected to a reset latch input RSN of the first D latch 114. The global reset signal RSTN is also connected to the reset latch input of the second D latches 118. The output of the second AND gate 124 is connected to a reset input RSN of the second RS latch 126. The output PFLAG1 (Q output) of the second RS latch 126 is connected to a data in input of the first synchronizer 128 and an input of the first OR gate 122. The first synchronizer 128 also has the global reset signal RSTN and the clock signal CLK1 of the first system as respective inputs to a reset input and a clock input. The output SYNFLAG1 of the first synchronizer 128 is connected to an input of the first OR gate 122 and an input of the second AND gate 124. The output FLAG1 of the first OR gate 122 is the flag generated by the circuit 100 that is connected to and used by the DSP 50 which is waiting for the flag FLAG1 to be reset. That is, in the example illustrated in FIGS. 2 and 3, FLAG1 represents the output buffer full flag JFULL used by the DSP 50. It must be noted that the circuit 100 also generates a flag FLAG2 which is the same as the flag FLAG1 but is connected to and used by the external device 60 (described below with reference to the resetting portion 104). The external device 60 in the current example, is waiting for JFULL (represented by FLAG2) to be set before reading information from the JTAG output buffer JOUT. The output FLAG1 of the first OR gate 122 is also connected to the first inverter 120. The output ENCLK1 of the first inverter 120 is connected to an input of the first and second clock drivers 110, 112.

A description of the operation of the setting portion 102 of the flag generating circuit 100 now follows. Initially, the set flag signal SETFLAG is delayed by passing it through the first and second D latches 114, 118. Note that the output CLK1T from the second clock driver 112 is used as the clock signal for the first D latch 114 while the output CLK1N from the first clock driver 110 is used as the clock signal for the second D latch 118. The output SETFLAG2 from the second D latch 118 is a delayed set flag signal SETFLAG. The set flag signal SETFLAG is delayed to allow the DSP 50 to complete its operation prior to setting the flag JFULL. When SETFLAG2 becomes high (i.e., set), the first output FLAG (Q output) from the first RS latch 130 becomes set while the second output FLAGN ($\overline{Q}$ output) is reset. The second output FLAGN ($\overline{Q}$ output) is passed to the first AND gate 116 which causes the first D latch 114 to reset which also causes the latch 114 output SETFLAG1 to reset immediately. The reset output SETFLAG1 from the first D latch 114 causes the output SETFLAG2 from the second D latch 118 to become low (i.e., reset) because CLK1N is high. Thus, the output SETFLAG2 from the second D latch 188 is set for a period that is just long enough to set FLAG. It must be noted that the two outputs FLAG, FLAGN from the first RS latch 130 will cause the output FLAG2 of the resetting portion 104 to also be set. Since the output FLAG must pass through additional circuitry to produce the output signal FLAG2 seen by the external device 60, a race condition with the resetting portion 104 which could occur at the first RS latch 130 is avoided. That is, the setting portion 102 and the resetting portion 104 are prevented from accessing the first RS latch 130 at the same time because SETFLAG2 is reset before the external device 60 detects that the FLAG2 has even been set and therefore, the external device 60 will not be attempting to reset FLAG2 while the setting portion 102 is setting it. As will be described below, a set FLAG2 will synchronously start the clock signals CLK2T, CLK2N of the resetting portion 104.

Continuing with a description of the operation of the setting portion 102, the set first output FLAG (Q output) from the first RS latch 130 passes through the second RS latch 126 and the first synchronizer 128 and the first OR gate 122. The first synchronizer 128 is used to synchronize the first output FLAG of the first RS latch 130 to the DSP 50 clock particularly after the first output FLAG is reset by the resetting portion 104 (described below). However, when the output FLAG is set by the DSP 50 it can be passed to the DSP 50 immediately via the second RS latch 126 and the first OR gate 122 to have a minimum set delay. The set output FLAG1 of the first OR gate 122 is connected to and used by the DSP 50. That is, in the example illustrated in FIGS. 2 and 3, FLAG1 represents the output buffer full flag JFULL used by the DSP 50. The external device 60 is waiting for JFULL (represented by FLAG2) to be set before reading information from the JTAG output buffer JOUT.

It must be noted that the first D latch 114 is in a "closed" state (i.e., in a continuous reset state) when the second output FLAGN ($\overline{Q}$ output) of the first RS latch 130 becomes low. Since FLAGN and the output RST1N from the first AND gate 116 stay low until the first output FLAG of the first RS latch 130 is reset, the clock signals CLK1T and CLK1N must be stopped to prevent a short circuit from occurring within the first D latch 114. The starting and stopping of the two clock signals CLK1T, CLK1N is accomplished by the output PFLAG1 of the second RS latch 126. PFLAG1 is set immediately after FLAG is set. Once set, the output PFLAG1 of the second RS latch 126 passes through the first OR gate 122 as the signal FLAG1 and through the first inverter 120 as an enable clock signal ENCLK1. The output ENCLK1 from the first inverter 120 is input into the first and second clock drivers 110, 112 which become disabled. The clocks signals CLK1N, and CLK1T are synchronously stopped and remain stopped until the drivers 110, 112 are again enabled (that is, when PFLAG1 is reset). The clock drivers 110, 112 are chosen such that the output CLK1T from the second driver 112 remains low while the output CLK1N from the first driver 110 remains high when stopped. Thus, when clock signal CLK1T is stopped, the first D latch 114 will remain reset without the possibility of being short circuited by a set flag signal SETFLAG. When clock signal CLK1N is stopped, the second D latch 118 will have an output SETFLAG2 that is always reset. During the time that the clock signals CLK1T, CLK1N are stopped, the external device 60 is reading information from the JTAG output buffer JOUT without interference from the DSP 50. In addition, if the DSP 50 initiates a SETFLAG signal (by starting a write to the JTAG output buffer JOUT), the SETFLAG signal will be isolated by the first D latch 114 since the latch 114 is still closed. When the resetting portion 104 resets the first output FLAG of the first RS latch 130 and, accordingly, resets PFLAG1, both clock signals CLK1T, CLK1N are synchronously started and the setting portion 102 is ready for a new set flag signal SETFLAG. FIG. 6 is a timing diagram illustrating a potential synchronization problem that is prevented by the circuitry of the flag setting portion 102. The DSP's 50 clock signal CLK1, the clock signals CLK1T, CLK1N of the setting portion 102 and the clock signal CLK2 for the external device 60 are illustrated. In addition, the potential improper timing of the output FLAG (Q output) from the first RS latch 130, the output FLAG2 connected to the external device 60, the reset signal RSTFLAG, synchronized flag signal SYNFLAG1 and enable clock signal ENCLK1 signal are also illustrated.

Since the first output FLAG (Q output) from the first RS latch 130 is being reset by the resetting portion 104 which is being operated by a different clock CLK2, FLAG must be synchronized by the first synchronizer 128 before it is used to start the clock signals CLK1T, CLK1N of the setting portion 102. The second RS latch 126 and the second AND gate 124 are needed to solve a synchronization problem that will arise if the DSP 50 clock signal CLK1 is much slower than the external device 60 clock signal CLK2. If the first output FLAG (Q output) of the first RS latch 130 was "nored" with the output SYNFLAG1 from the first synchronizer 128 to form ENCLK1 without using AND gate 124 and the second RS latch 126 and CLK1 was very slow, FLAG would be reset before a set FLAG can be passed to the synchronizer 128. If this happens, the output SYNFLAG1 from the first synchronizer 128 will always be low. As shown in FIG. 6, the rising edge labeled EDGE2 of the ENCLK1 signal will be a CLK2 edge instead of a CLK1 edge. If this happens, the clock signals CLK1T, CLK1N will be started asynchronously.

Accordingly, the output PFLAG1 from the second RS latch 126 is "ored" with the output SYNFLAG1 of the first synchronizer 128 and then inverted by the first inverter 120 to generate the output ENCLK1 from the first inverter 120. Now, the output PFLAG1 from the second RS latch 126 is reset only if SYNFLAG1 becomes set and FLAG is reset by the resetting portion 104. ENCLK1 will not become high until a high FLAG is passed through the second RS latch 126 and the first synchronizer 128 creating a high PFLAG1 and a high SYNFLAG1. Accordingly, the two clock signals CLK1T, CLK1N are started synchronously.

Referring back to FIG. 5, the input of the flag resetting portion 104 will be connected to the system responsible for resetting the flag generated by the circuit 100 while the output of the portion 104 is connected to the system waiting for the flag generated by the circuit 100 to be set. Continuing with the example illustrated in FIGS. 2 and 3, the input and output of the flag resetting portion 104 will be connected to the external device 60 through the JTAG port 56 and JTAG interface 54 and the flag to be reset will be the buffer full flag JFULL. The reset flag signal RSTFLAG will be derived from a read JTAG output buffer signal when the external device 60 reads data from the output buffer JOUT. The flag resetting portion 104 includes third and fourth clock drivers 132, 134, third and fourth AND gates 136, 148, second OR gate 144, an inverter 140, a NOR gate 146, a second synchronizer 152, third and fourth type D latches 138, 142 and first and third RS latches 130, 150. It must be noted that the first RS latch 130 is also shared with the flag setting portion 102.

The third clock driver 132 has an input connected to the clock signal CLK2 of the external device 60 and an output CLK2T connected to a clock input CLK of the third D latch 138. The fourth clock driver 134 has an input connected to the clock signal CLK2 and an output CLK2N connected to a clock input CLK of the fourth D latch 142. The third D latch 138 receives the RSTFLAG signal as a data in input DIN and has an output RSTFLAG1 connected to a data in input DIN of the fourth D latch 142. The fourth D latch 142 has an output RSTFLAG2 connected to an input of the second OR gate 144. The second OR gate 144 has an output RSTFLAG3 connected to a reset input RSN of the first RS latch 130. The second output FLAGN ($\overline{Q}$ output) of the first RS latch 130 is connected to an input of the third RS latch 150 and an input of the NOR gate 146. The first output FLAG (Q output) of the first RS latch 130 is connected to an input of the third AND gate 136. As described above the outputs FLAG, FLAGN are also connected to the setting portion 102.

The global reset signal RSTN is connected to the input of the second inverter 140. The output of the second inverter 140 is connected to an input of the second OR gate 144. The third AND gate 136 also has the global reset signal RSTN as an input. The output RST2N of the third AND gate 136 is connected to a reset input RSN of the third D latch 138. The output of the NOR gate 146 is connected to a set input S of the third RS latch 150. The output PFLAG2 (Q output) of the third RS latch 150 is connected to a data in input of the second synchronizer 152 and an input of the fourth AND gate 148. The second synchronizer 152 also has the global reset signal RSTN and the clock signal CLK2 of the second system as respective reset and clock inputs. The output SYNFLAG2 of the second synchronizer 152 is connected to an input of the NOR gate 146 and an input of the fourth AND gate 148. The output FLAG2 of the fourth AND gate 148 is the flag generated by the circuit 100 that is connected to and used by the system waiting for the flag to be set. That is, in the example illustrated in FIGS. 2 and 3, FLAG2 represents the output buffer full flag JFULL used by the external device 60. It must be noted that the circuit 100 also generates a FLAG1 which is the same as FLAG2 but is connected to and used by the DSP 50 (as described above). As will be described below, the DSP 50 in the current example, is waiting for JFULL (represented by FLAG1) to be reset before writing information into the JTAG output buffer JOUT. The output FLAG2 of the fourth AND gate 148 is also connected to an input of the third and fourth clock drivers 132, 134.

A description of the operation of the resetting portion 104 of the flag generating circuit 100 now follows. Initially, the reset flag signal RSTFLAG is delayed by passing it through the third and fourth D latches 138, 142. Note that the output CLK2T from the third clock driver 132 is used as the clock signal for the third D latch 138 while the output CLK2N from the fourth clock driver 134 is used as the clock signal for the fourth D latch 142. The output RSTFLAG3 from the second OR gate 144 is the delayed reset flag signal RSTFLAG. The reset flag signal RSTFLAG is delayed to allow the external device 60 to complete its operation prior to resetting the flag JFULL. When RSTFLAG3 becomes high (i.e., set), the first output FLAG (Q output) from the first RS latch 130 becomes reset while the second output FLAGN ($\overline{Q}$ output) is set. The second output FLAGN causes the third D latch 138 to reset which causes the output RSTFLAG1 of the third D latch 138 to reset immediately. The reset output RSTFLAG1 from the third D latch 138 causes the output RSTFLAG2 from the fourth D latch 142 to become low (i.e., reset) and, accordingly, the output RSTFLAG3 from the second OR gate 144 to become reset. The output RSTFLAG3 from the second OR gate 144 is set for a period that is just long enough to reset FLAG and set FLAGN. As stated above with reference to the flag setting portion 102, a reset FLAG starts the clock signals CLK1T, CLK1N enabling the setting portion 102 to set FLAG1 (and FLAG2) upon receiving a set flag signal SETFLAG. It must be noted that the two outputs FLAG, FLAGN from the first RS latch 130 will cause the output FLAG1 of the setting portion 104 to also be reset. Since the output FLAGN must pass through additional circuitry before generating the output FLAG1, a race condition with the setting portion 102 which could occur at the first RS latch 130 is avoided. That is, the resetting portion 104 and the setting portion 102 are prevented from accessing the first RS latch 130 at the same time because RSTFLAG3 is reset before the DSP 50 detects that FLAG1 has even been reset and therefore, the DSP 50 will not be attempting to set FLAG1 and FLAG2 while the resetting portion 104 is resetting them. As described above with reference to the setting portion 102, a reset FLAG1 will synchronously start the clock signals CLK1T, CLK1N of the setting portion 102.

Returning to the resetting portion 104, the set second output FLAGN from the first RS latch 130 passes through the third RS latch 150, second synchronizer 152 and the fourth AND gate 148 and becomes a reset output FLAG2 of the fourth AND gate 148. The second synchronizer 152 is used to synchronize the second output FLAGN of the first RS latch 130 to the clock of the external device 60 particularly after the second output FLAGN is reset by the setting portion 102. The reset output FLAG2 of the fourth AND gate 148 is connected to and used by the external device 60. That is, in the example illustrated in FIGS. 2 and 3, FLAG2 represents the output buffer full flag JFULL used by the external device 60. The DSP 50 is waiting for JFULL (represented by FLAG1) to be reset before writing information into the JTAG output buffer JOUT.

It must be noted that the third D latch 138 is in a "closed" state (i.e., in a continuous reset state) when the first output FLAG of the first RS latch 130 becomes low. Since the first output FLAG of the first RS latch 130 and the output RST2N from the third AND gate 136 stay low until the second output FLAGN of the first RS latch 130 is set, the clock signals CLK2T and CLK2N must be stopped to prevent a short circuit from occurring within the third D latch 138. The starting and stopping of the two clock signals CLK2T, CLK2N is accomplished by the output PFLAG2 of the third RS latch 150 and the output SYNFLAG2 of the second synchronizer 152. PFLAG2 is reset immediately after FLAGN is set. Once reset, the output PFLAG2 of the third RS latch 150 passes through the fourth AND gate 148. The output from the fourth AND gate 148 is input into the third and fourth clock drivers 132, 134 which become disabled. The clocks signals CLK2N, and CLK2T are synchronously stopped and remain stopped until the drivers 132, 134 are enabled (that is, when SYNFLAG2 is set after the setting portion 102 sets the output FLAG and resets the output FLAGN of the first RS latch 130). The clock drivers 132, 134 are chosen such that the output CLK2T from the third driver 132 remains low while the output CLK2N from the fourth driver 134 remains high when stopped. Thus, when clock signal CLK2T is stopped, the third D latch 138 will remain reset without the possibility of being short circuited by a reset flag signal RSTFLAG. When clock signal CLK2N is stopped, the fourth D latch 142 will have an output RSTFLAG2 that is always reset. The output RSTFLAG3 from the second OR gate 144 will also be reset. During the time that the clock signals CLK2T, CLK2N are stopped, the DSP 50 is writing into the JTAG output buffer JOUT without interference from the external device 60. In addition, if the external device 60 initiates a RSTFLAG signal (by starting a read operation on the JTAG output buffer JOUT), the RSTFLAG signal will be isolated by the third D latch 138 since the latch 138 is still closed. When the setting portion 102 sets the first output FLAG of the first RS latch 130 and, accordingly, sets SYNFLAG2, both clock signals CLK2T, CLK2N are synchronously started and the resetting portion 104 is ready for a new reset flag signal RSTFLAG.

It must be noted that any of the RS latches 126, 130, 150 can be replaced by a JK latch or any other latch or combination of latches that can set or reset signals. It must also be noted that one or more portions of the present invention may be performed in software by a programmed general purpose computer. Thus, one or more portions of the present invention may be performed with hardware, firmware, software or any combination of these.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A circuit for generating a control flag, said circuit comprising:

a first component connected to receive and be responsive to a first input signal, said first component generating a first flag signal representing said control flag to control a first device and generating a first output signal representing said first input signal;

a second component connected to receive and be responsive to a second input signal, said second component generating a second flag signal representing said control flag to control a second device and generating a second output signal representing said second input signal; and a third component connected to and responsive to said first and second output signals, said third component generating outputs connected to said first and second components, said outputs preventing said first and second flag signals from being generated by said first and second components at the same time.

2. The circuit according to claim 1 wherein said first input signal is a set flag signal.

3. The circuit according to claim 1 wherein said first input signal is a reset flag signal.

4. The circuit according to claim 1 wherein said second input signal is a set flag signal.

5. The circuit according to claim 1 wherein said second input signal is a reset flag signal.

6. The circuit according to claim 1 wherein preventing said first and second flag signals from being generated at the same time is performed by disconnecting said first input signal from said first component in response to said outputs such that said first component is no longer responsive to said first input signal.

7. The circuit according to claim 1 wherein preventing said first and second flag signals from being generated at the same time is performed by disconnecting said second input signal from said second component in response to said outputs such that said second component is no longer responsive to said second input signal.

8. The circuit according to claim 1 wherein said second input signal is asynchronous with respect to said first input signal.

9. The circuit according to claim 1 wherein said third component is a latch capable of setting and resetting said outputs.

10. The circuit according to claim 9 wherein said third component is an RS latch.

11. The circuit according to claim 9 wherein said third component is a JK latch.

12. The circuit according to claim 1 wherein said first component comprises:

a first latching circuit having an input connected to said first input signal and said first output signal connected to said third component; and a synchronizing circuit having an input connected to said outputs of said third component, said synchronizing circuit generating said first flag signal.

13. The circuit according to claim 12 wherein said first latching circuit comprises:

a first clock driver connected to a clock signal source, said first clock driver having a first clock signal output;

a second clock driver connected to said clock signal source, said second clock driver having a second clock signal output that is out of phase with respect to said first clock signal output;

a first latch connected to said first clock signal output and to said first input signal, said first latch having a first latch output; and a second latch connected to said second clock signal output and to said first latch output, said second latch generating a delayed first input signal, said delayed first input signal being connected to said third component.

14. The circuit according to claim 13 wherein said synchronizing circuit comprises:
a third latch having an input connected to said outputs of said third component, said third latch having an output responsive to said outputs of said third component;
a synchronizer having an input connected to said output of said third latch, said synchronizer for synchronizing said output of said third latch to the clock signal of said first component, said synchronizer having an output representing a synchronized output of said third latch;
a first OR gate having an input connected to said output of said synchronizer and said output of said third latch, said first OR gate generating said first flag signal as an output; and
an inverter, said inverter having an input connected to said first flag signal, said inverter having an output connected to said plurality of clock drivers, wherein said inverter output is used to enable or disable said first and second clock drivers.

15. The circuit according to claim 14 wherein said third latch is an RS latch.

16. The circuit according to claim 14 wherein said third latch is a JK latch.

17. The circuit according to claim 12 wherein said second circuit comprises:
a first latching circuit having an input connected to said second input signal and said second output signal connected to said third component; and
a synchronizing circuit having an input connected to said outputs of said third component, said synchronizing circuit generating said second flag signal.

18. The circuit according to claim 17 wherein said first latching circuit comprises:
a first clock driver connected to a clock signal source, said first clock driver having a first clock signal output;
a second clock driver connected to said clock signal source, said second clock driver having a second clock signal output that is out of phase with respect to said first clock signal output;
a first latch connected to said first clock signal output and to said second input signal, said first latch having a first latch output;
a second latch connected to said second clock signal output and to said first latch output, said second latch having a second latch output; and
an OR gate having an input connected to said second latch output, said OR gate generating a delayed second input signal, said delayed second input signal being connected to said third component.

19. The circuit according to claim 18 wherein said synchronizing circuit comprises:
a NOR gate connected to an output of said third component, said NOR gate having an output;
a third latch having an input connected to an output of said third component and an input connected to said output of said NOR gate, said third latch having an output responsive to said outputs of said third component;
a synchronizer having an input connected to said output of said third latch, said synchronizer for synchronizing said output of said third latch to the clock signal of said second component, said synchronizer having an output representing a synchronized output of said third latch; and a first AND gate having an input connected to said output of said synchronizer and said output of said third latch, said first AND gate generating said second flag signal, said second flag signal being connected to said plurality of clock drivers, wherein said second flag signal is used to enable or disable said first and second clock drivers.

20. The circuit according to claim 19 wherein said third latch is an RS latch.

21. The circuit according to claim 19 wherein said third latch is a JK latch.

22. A digital signal processor system comprising:
first means for generating a first flag signal representing a control flag to control a first device, said first means being responsive to a first input signal and generating a first output signal representing said first input signal;
second means for generating a second flag signal representing said control flag to control a second device, said second means being responsive to a second input signal and generating a second output signal representing said second input signal; and
third means for generating outputs preventing said first and second flag signals from being generated at the same time, said first and second means being responsive to said outputs, said third means being responsive to said first and second output signals.

23. The system according to claim 22 wherein said first input signal is a set flag signal.

24. The system according to claim 22 wherein said first input signal is a reset flag signal.

25. The system according to claim 22 wherein said second input signal is a set flag signal.

26. The system according to claim 22 wherein said second input signal is a reset flag signal.

27. The system according to claim 22 wherein said control flag is a Joint Test Access Group (JTAG) output buffer full flag.

28. The system according to claim 22 wherein preventing said first and second flag signals from being generated at the same time is performed by disconnecting said first input signal from said first means in response to said outputs such that said first means is no longer responsive to said first input signal.

29. The system according to claim 22 wherein preventing said first and second flag signals from being generated at the same time is performed by disconnecting said second input signal from said second means in response to said outputs such that said second means is no longer responsive to said second input signal.

30. The system according to claim 22 wherein said second input signal is asynchronous with respect to said first input signal.

31. The system according to claim 22 wherein said first means comprises:
first latching means having an input connected to said first input signal and said first output signal connected to said third means; and
synchronizing means for generating said first flag signal, said synchronizing means having an input connected to said outputs of said third means.

32. The system according to claim 22 wherein said second means comprises:
first latching means having an input connected to said second input signal and said second output signal connected to said third means; and
synchronizing means for generating said second flag signal, said synchronizing means having an input connected to said outputs of said third means.

33. An integrated circuit comprising:
   a first circuit for generating a first flag signal representing a control flag to control a first device, said first circuit being responsive to a first input signal a generating a first output signal representing said first input signal;
   a second circuit for generating a second flag signal representing said control flag to control a second device, said second circuit being responsive to a second input signal and generating a second output signal representing said second input signal; and
   a third circuit for generating outputs preventing said first and second flag signals from being generated at the same time, said first and second circuits being responsive to said outputs, said third circuit being responsive to said first and second output signals.

34. The integrated circuit according to claim 33 wherein said first input signal is a set flag signal.

35. The integrated circuit according to claim 33 wherein said first input signal is a reset flag signal.

36. The integrated circuit according to claim 33 wherein said second input signal is a set flag signal.

37. The integrated circuit according to claim 33 wherein said second input signal is a reset flag signal.

38. The integrated circuit according to claim 33 wherein said first device is a digital signal processor.

39. The integrated circuit according to claim 38 wherein said control flag is a Joint Test Access Group (JTAG) output buffer full flag.

40. The integrated circuit according to claim 33 wherein preventing said first and second flag signals from being generated at the same time is performed by disconnecting said first input signal from said first circuit in response to said outputs such that said first circuit is no longer responsive to said first input signal.

41. The integrated circuit according to claim 33 wherein preventing said first and second flag signals from being generated at the same time is performed by disconnecting said second input signal from said second circuit in response to said outputs such that said second circuit is no longer responsive to said second input signal.

42. The integrated circuit according to claim 33 wherein said second input signal is asynchronous with respect to said first input signal.

43. The circuit according to claim 33 wherein said first circuit comprises:
   a first latching circuit having an input connected to said first input signal and said first output signal connected to said third circuit; and
   a synchronizing circuit for generating said first flag signal, said synchronizing circuit having an input connected to said outputs of said third circuit.

44. The integrated circuit according to claim 33 wherein said second circuit comprises:
   a first latching circuit having an input connected to said second input signal and said second output signal connected to said third circuit; and
   a synchronizing circuit for generating said second flag signal, said synchronizing circuit having an input connected to said outputs of said third circuit.

45. A method of generating a control flag, said method comprising:
   inputting a first signal into a first component;
   latching said first signal to form a delayed first signal;
   generating a first flag signal representing a control flag responsive to said delayed first signal;
   disconnecting said first signal from said first component after generating a first flag signal representing said control flag by resetting a portion of said first component responsible for inputting said first signal;
   inputting a second signal into a second component;
   latching said second signal to form a delayed second signal;
   generating a second flag signal representing said control flag responsive to said delayed second signal;
   disconnecting said second signal from said second component after generating said second flag signal representing said control flag; and
   connecting said first signal to said first component such that said first component may input said first signal.

46. The method according to claim 45 wherein the step of disconnecting said second signal is performed by resetting a portion of said second component responsible for inputting said second signal.

47. The method according to claim 46 wherein said first component has a first clock signal and said second component has a second clock signal, said method further comprising the step of starting said first clock signal when waiting for said second flag signal to be generated and stopping said first clock signal when generating said first flag signal.

48. The method according to claim 46 wherein said first component has a first clock signal and said second component has a second clock signal, said method further comprising the step of starting said second clock signal when waiting for said first flag signal to be generated and stopping said second clock signal when generating said second flag signal.

49. A method of manufacturing an integrated circuit for generating a flag representing a status of said circuit, said method comprising:
   providing a first component connected to receive and be responsive to a first input signal, said first component generating a first flag signal representing a control flag to control a first device and generating a first output signal representing said first input signal;
   providing a second component connected to receive and be responsive to a second input signal, said second component generating a second flag signal representing said control flag to control a second device and generating a second output signal representing said second input signal; and
   providing a third component connected to and responsive to said first and second output signals, said third component generating outputs connected to said first and second components, said outputs preventing said first and second flag signals from being generated at the same time.

50. The method according to claim 49 wherein the step of providing said third component is performed by providing a latch capable of setting and resetting said outputs.

51. The method according to claim 50 wherein the step of providing said third component is performed by providing an RS latch.

52. The method according to claim 50 wherein the step of providing said third component is performed by providing a JK latch.
   providing a second clock driver connected to said clock signal source, said second clock driver having a second clock signal output that is out of phase with respect to said first clock signal output;
   providing a first latch connected to said first clock signal output and to said first signal, said first latch having a first latch output; and providing a second latch connected to said second clock signal output and to said first latch output, said second latch generating a delayed first signal, said delayed first signal being connected to said third component.

53. The method according to claim 49 wherein the step of providing said first component comprises:

providing a first latching circuit having an input connected to said first input signal and said first output signal connected to said third component; and providing a synchronizing circuit having an input connected to said outputs of said third component, said synchronizing circuit generating said first flag signal.

54. The method according to claim 53 wherein the step of providing said first latching circuit comprises:

providing a first clock driver connected to a clock signal source, said first clock driver having a first clock signal output;

providing a second clock driver connected to said clock signal source, said second clock driver having a second clock signal output that is out of phase with respect to said first clock signal output;

providing a first latch connected to said first clock signal output and to said first input signal, said first latch having a first latch output; and providing a second latch connected to said second clock signal output and to said first latch output, said second latch generating a delayed first input signal, said delayed first input signal being connected to said third component.

55. The method according to claim 54 wherein the step of providing said synchronizing circuit comprises:

providing a third latch having an input connected to said outputs of said third component, said third latch having an output responsive to said third component outputs;

providing a synchronizer having an input connected to said output of said third latch, said synchronizer for synchronizing said output of said third latch to the clock signal of said first component, said synchronizer having an output representing a synchronized output of said third latch;

providing a first OR gate having an input connected to said output of said synchronizer and said output of said third latch, said first OR gate generating said first flag signal as an output; and providing an inverter, said inverter having an input connected to said first flag signal, said inverter having an output connected to said plurality of clock drivers, wherein said inverter output is used to enable or disable said first and second clock drivers.

56. The method according to claim 55 wherein the step of providing said third latch is performed by providing an RS latch.

57. The method according to claim 55 wherein the step of providing said third latch is performed by providing a JK latch.

58. The method according to claim 49 wherein the step of providing said second circuit comprises:

providing a first latching circuit having an input connected to said second input signal and said second output signal connected to said third component; and providing a synchronizing circuit having an input connected to said outputs of said third component, said synchronizing circuit generating said second flag signal.

59. The method according to claim 58 wherein the step of providing said first latching circuit comprises:

providing a first clock driver connected to a clock signal source, said first clock driver having a first clock signal output;

providing a second clock driver connected to said clock signal source, said second clock driver having a second clock signal output that is out of phase with respect to said first clock signal output;

providing a first latch connected to said first clock signal output and to said second input signal, said first latch having a first latch output;

providing a second latch connected to said second clock signal output and to said first latch output, said second latch having a second latch output; and providing an OR gate having an input connected to said second latch output, said OR gate generating a delayed second input signal, said delayed second input signal being connected to said third component.

60. The method according to claim 59 wherein the step of providing said synchronizing circuit comprises:

providing a NOR gate connected to an output of said third component, said NOR gate having an output;

providing a third latch having an input connected to an output of said third component and an input connected to said output of said NOR gate, said third latch having an output responsive to said third component outputs;

providing a synchronizer having an input connected to said output of said third latch, said synchronizer for synchronizing said output of said third latch to the clock signal of said second component, said synchronizer having an output representing a synchronized output of said third latch; and providing a first AND gate having an input connected to said output of said synchronizer and said output of said third latch, said first AND gate generating said second flag signal, said second flag signal being connected to said plurality of clock drivers, wherein said second flag signal is used to enable or disable said first and second clock drivers.

61. The method according to claim 60 wherein the step of providing said third latch is performed by providing an RS latch.

62. The method according to claim 60 wherein the step of providing said third latch is performed by providing a JK latch.

* * * * *